United States Patent [19]

Li

[11] 4,074,037

[45] Feb. 14, 1978

[54] THERMOPLASTIC TERPOLYMERS OF ACRYLONITRILE, VINYL ESTERS AND INDENE

[75] Inventor: George S. Li, Aurora, Ohio

[73] Assignee: The Standard Oil Company, Cleveland, Ohio

[21] Appl. No.: 772,724

[22] Filed: Feb. 28, 1977

[51] Int. Cl.$^2$ ............................................. C08F 244/00
[52] U.S. Cl. .................................. 526/280; 526/248; 526/267; 526/268
[58] Field of Search ................ 526/248, 267, 268, 280

[56] References Cited

U.S. PATENT DOCUMENTS

| | | | |
|---|---|---|---|
| 3,926,871 | 12/1975 | Hensley | 526/267 |
| 3,926,926 | 12/1975 | Li et al. | 526/267 |
| 3,997,709 | 12/1976 | Aziz et al. | 526/268 |

*Primary Examiner*—Harry Wong, Jr.
*Attorney, Agent, or Firm*—John F. Jones; Larry W. Evans

[57] ABSTRACT

Thermoplastic polymer resins which are high softening are composed of an olefinically unsaturated nitrile, such as acrylonitrile, a vinyl ester, such as vinyl acetate, and indene, are described.

8 Claims, No Drawings

THERMOPLASTIC TERPOLYMERS OF ACRYLONITRILE, VINYL ESTERS AND INDENE

The present invention relates to novel polymeric compositions which have high-softening temperatures and are composed of the essential components of an olefinically unsaturated nitrile, a vinyl ester, and indene, and to a process for preparing them.

The novel polymeric products of the present invention are prepared by polymerizing a major portion of an olefinically unsaturated nitrile, such as acrylonitrile, and a minor portion of a vinyl ester, such as vinyl acetate, and indene.

The olefinically unsaturated nitriles useful in this invention are the alpha,beta-olefinically unsaturated mononitriles having the structure

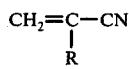

wherein R is
hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. Preferred is acrylonitrile.

The vinyl esters useful in this invention are preferably vinyl esters of lower monocarboxylic acids having the structure $R_1COOCH=CH_2$ wherein $R_1$ is hydrogen or an alkyl group having from 1 to 5 carbon atoms. Most preferred vinyl ester is vinyl acetate.

Indene (1-H-indene) and coumarone (2,3-benzofuran) and mixtures are useful as monomers in the present invention. Most preferred is indene.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The use of mercaptans or other chain modifiers is not required and it is preferred that they not be used in the process of this invention. The preferred method is polymerization in aqueous medium by emulsion or suspension polymerization. The polymerization is preferably carried out in an aqueous medium in the presence of an emulsifier or suspending agent and a free radical generating polymerization initiator at a temperature of from about 0° to 100° C in the substantial absence of molecular oxygen.

The preferred polymeric compositions embodied herein are those resulting from the polymerization of (A) from about 50 to 80% by weight of at least one nitrile having the structure

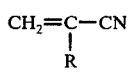

wherein R has the foregoing designation, (B) from about 10 to 40% by weight of a vinyl ester having the structure $R_1COOCH=CH_2$ wherein $R_1$ has the foregoing designation, and (C) from about 10 to 20% by weight of at least one member selected from the group consisting of indene and coumarone wherein the given percentages of (A), (B) and (C) are based on the combined weight of (A) plus (B) plus (C).

More specifically, the present invention can be illustrated in the polymerization of a mixture of acrylonitrile, vinyl acetate and indene to produce a product having exceptionally good impermeability to gases and vapors and improved ASTM heat-distortion temperature.

The novel polymeric products of the present invention are thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance which makes them useful in the packaging industry, and they are particularly useful in the manufacture of bottles, film, and other types of containers for liquids and solids.

In the following illustrative examples, the amounts of ingredients are expressed in parts by weight unless otherwise indicated.

EXAMPLE 1

An acrylonitrile-vinyl acetate-indene terpolymer was prepared using the following ingredients and procedure:

| Ingredient | Parts |
|---|---|
| water | 200 |
| hydroxyethyl cellulose | 0.2 |
| acrylonitrile | 50 |
| vinyl acetate | 36 |
| indene | 14 |
| azobisisobutyronitrile | 0.6 |

The initial polymerization mixture contained no azobisisobutyronitrile and only 4 parts of indene. This mixture was stirred continuously under a nitrogen atmosphere and brought to 60° at which time 0.2 part of azobisisobutyronitrile was added. The remaining 10 parts of indene were added continuously to the reaction mixture over a 7-hour period. Two additional 0.2-part portions of azobisisobutyronitrile were also added at the 2.5-hour and 5-hour points during the 7-hour polymerization time. At the end of the 7-hour reaction time, the temperature of the mixture was raised to 70°75° C and was stirred for an additional 1½ hours in this temperature range. The resulting crude resin was isolated by filtration and was further purified by stirring with boiling acetone followed by washing with methanol. The final purified and dried polymer had the following properties: molecular weight, by GPC, $0.98 \times 10^5$; Brabender plasticorder torque, 35 rpm, 230° C, 1000 meter grams; ASTM (264 psi) heat-distortion temperature 110° C; flexural strength $6.47 \times 10^3$ psi; flexural modulus $6.34 \times 10^5$ psi; and tensile strength $5.11 \times 10^3$ psi.

EXAMPLE 2

An acrylonitrile:vinyl acetate:indene terpolymer having the monomer weight ratio of 60:20:20 was prepared by the procedure of Example 1. The resulting resin was found to have a molecular weight of $0.96 \times 10^5$, a Brabender plasticorder torque at 35 rpm and 230° C of 900 meter grams, an ASTM heat-distortion temperature (264 psi) of 112° C, a flexural strength of $6.23 \times 10^3$ psi, and a flexural modulus of $6.26 \times 10^5$ psi.

EXAMPLE 3

A. An acrylonitrile:vinyl acetate indene terpolymer having the weight ratio 70:10:20 was prepared according to the procedure of Example 1. The resulting resin had a molecular weight of $1.32 \times 10^5$, a Brabender torque at 35 rpm and 230° C of 1600 meter grams, an ASTM (264 psi) heat-distortion temperature of 112° C, a flexural strength of $8.56 \times 10^3$ psi, a flexural modulus of $6.51 \times 10^5$ psi, and a tensile strength of $8.14 \times 10^3$ psi.

B. A 70:30 copolymer of acrylonitrile:vinyl acetate which is outside the scope of the present invention was prepared in accordance with the procedure of Example 1. Because no indene was included in the recipe, it was not necessary to add any monomer continuously during the polymerization reaction. The resulting resin was found to have a molecular weight (GPC) of $5 \times 10^5$, a Brabender plasticorder torque at 230° C and 35 rpm of greater than 5000 meter grams (would not fuse properly), and an ASTM heat-distortion temperature (264 psi) of only 85° C.

EXAMPLE 4

A terpolymer was prepared using a total weight ratio of 66.5:10;23.5 of acrylonitrile:vinyl acetate:indene from the following ingredients:

| Ingredient | Parts |
| --- | --- |
| water | 200 |
| hydroxyethyl cellulose | 0.2 |
| acrylonitrile | 66.5 |
| vinyl acetate | 10 |
| indene | 23.5 |
| 2,2'-azo-bis(2,4-dimethyl)valeronitrile | 0.6 |

In the initial polymerization mixture, only 9.5 parts of indene and no 2,2'-azo-bis(2,4-dimethyl)-valeronitrile were included. The initial mixture was stirred under a nitrogen atmosphere and brought to 63° C at which point 0.2 part of 2,2'-azo-bis(2,4-dimethyl)-valeronitrile was added. A continuous feed into the reaction mixture of 14 parts of indene was used over a 7-hour period. Also at the 2.5-hour and 5-hour points during the 7-hour reaction time, portions of 0.2-part of 2,2'-azo-bis(2,4-dimethyl)valeronitrile were added. At the end of this reaction time, the temperature of the polymerization mixture was raised to the range 70°-75° C and stirring was continued for an additional 1½ hours. The resulting resin was isolated as in Example 1. The final purified and dried polymer was found to have a molecular weight of $1 \times 10^5$, a Brabender plasticorder torque at 230° C and 35 rpm of 1150 meter grams, an ASTM heat-distortion temperature (264 psi) of 98° C, a flexural strength of $4.8 \times 10^3$ psi, a flexural modulus of $4.98 \times 10^5$ psi, and a tensile strength of $4.61 \times 10^3$ psi.

I claim:
1. The terpolymer composition resulting from the copolymerization of
    A. from about 50 to 80% by weight of at least one nitrile having the structure

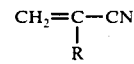

wherein R is hydrogen, a lower alkyl group having from 1 to 4 carbon atoms, or a halogen,
    B. from about 10 to 40% by weight of a vinyl ester having the structure $R_1COOCH{=}CH_2$ wherein $R_1$ is hydrogen or an alkyl group having from 1 to 5 carbon atoms, and
    C. from about 10 to 20% by weight of at least one member selected from the group consisting of indene and coumarone, wherein the given percentages of (A), (B) and (C) are based on the combined weight of (A) plus (B) plus (C).

2. The composition of claim 1 wherein (A) is acrylonitrile.
3. The composition of claim 2 wherein (B) is vinyl acetate.
4. The composition of claim 3 wherein (C) is indene.
5. The process comprising polymerization in aqueous medium with free-radical initiation at a temperature in the range of from 0° to 100° C
    A. from about 50 to 80% by weight of at least one nitrile having the structure

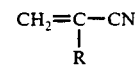

wherein R is hydrogen, a lower alkyl group having from 1 to 4 carbon atoms, or a halogen,
    B. from about 10 to 40% by weight of a vinyl ester having the structure $R_1COOCH{=}CH_2$ wherein $R_1$ is hydrogen or an alkyl group having from 1 to 5 carbon atoms, and
    C. from about 10 to 20% by weight of at least one member selected from the group consisting of indene and coumarone, wherein the given percentages of (A), (B) and (C) are based on the combined weight of (A) plus (B) plus (C).

6. The process of claim 5 wherein (A) is acrylonitrile.
7. The process of claim 6 wherein (B) is vinyl acetate.
8. The process of claim 7 wherein (C) is indene.

* * * * *